United States Patent [19]

Areaux

[11] Patent Number: 5,735,935
[45] Date of Patent: Apr. 7, 1998

[54] METHOD FOR USE OF INERT GAS BUBBLE-ACTUATED MOLTEN METAL PUMP IN A WELL OF A METAL-MELTING FURNACE AND THE FURNACE

[75] Inventor: Larry D. Areaux, Buena Vista, Colo.

[73] Assignee: Premelt Pump, Inc., Kalamazoo, Mich.

[21] Appl. No.: 743,720

[22] Filed: Nov. 6, 1996

[51] Int. Cl.$^6$ ........................................... C22B 9/16
[52] U.S. Cl. ..................... 75/571; 75/581; 75/602; 75/621; 75/686; 75/687; 75/708; 266/207; 266/901; 420/590
[58] Field of Search ..................... 75/708, 580, 581, 75/686, 687, 602, 621, 571; 420/590; 266/207, 901

[56] References Cited

U.S. PATENT DOCUMENTS 5,203,910  4/1993  Areaux et al. ........................ 266/200
5,211,744  5/1993  Areaux et al. ........................ 75/686

Primary Examiner—Melvyn Andrews
Attorney, Agent, or Firm—The Firm of Gordon W. Heuschen

[57] ABSTRACT

An inert gas bubble-actuated molten metal pump is located in a metal-melting furnace to effect circulation of molten metal throughout the furnace. The inert gas employed to actuate the molten metal pump is captured beneath a heat-resistant and flame-resistant cover located above the exit port of the pump and over a substantial portion of the molten metal, thereby to prevent splashing, spattering, and disruption of a thin protective layer or skin of oxidized metal at the surface of the molten metal as well as to provide a non-oxidizing atmosphere at the surface of the molten metal beneath said cover. In this manner and by this combination, the inert gas is employed most efficiently and economically.

24 Claims, 1 Drawing Sheet

METHOD FOR USE OF INERT GAS BUBBLE-ACTUATED MOLTEN METAL PUMP IN A WELL OF A METAL-MELTING FURNACE AND THE FURNACE

BACKGROUND OF THE INVENTION

1. Field of the Invention

Use of an inert gas bubble-actuated molten metal pump in a metal-melting furnace, e.g., in a well or between wells thereof, to effect circulation of molten metal in and throughout the furnace and, in combination, a heat- and flame-resistant cover above the exit port of the pump and over a substantial portion of the molten metal, thereby to prevent splashing and spattering and/or disruption of a thin layer or skin of oxidized metal at the surface of the molten metal and simultaneously to provide a non-oxidizing atmosphere at the surface of the molten metal, thereby also attaining maximum economic utilization of the inert gas.

2. Prior Art

The state of the art regarding the introduction of metal chips into the charge well of a metal melting furnace and the conveyance of molten metal from one place to another within or out of a metal melting furnace has been fully reviewed in my prior U.S. patents, namely, U.S. Pat. Nos. 4,702,768, 4,710,126, 4,721,457, 4,872,907, 5,211,744, 5,203,910, 5,403,381, 5,468,280 and 5,407,462, the disclosures of which patents are incorporated herein by reference.

In particular, the employment of an inert gas bubble-actuated molten metal pump for moving molten metal from one place to another in a metal-melting furnace or out of a metal melting furnace has been disclosed in my prior U.S. Pat. No. 5,203,910 as well as in my U.S. Pat. Nos. 5,403,381 and 5,468,280. A heat- and flame-resistant cover for at least a substantial portion of a charge well has been disclosed in my U.S. Pat. No. 5,211,744. Various methods and charger means for introducing metal chips into the charge well of a metal-melting furnace have been disclosed in my prior U.S. patents, in particular a stripforming briquetter device and method in my prior U.S. Pat. No. 4,702,768, a compacting extruder method and means in my prior U.S. Pat. No. 4,872,907, and a mass flow gravity feed method and apparatus for charging metal chips into the charge well of a metal-melting furnace in my prior U.S. Pat. No. 5,407,462.

Although the inventions of these prior patents have gone far in advancing the state of the art, including the conveyance of molten metal from one place to another in a metal melting furnace or out of the metal-melting furnace, an improvement in the efficiency is always a highly desirable objective and one which is fulfilled admirably by the provision of the present invention whereby certain of the salient features of my prior inventions and patents are combined in a manner which overcomes previously-unknown or unrecognized shortcomings, minimizes unnecessary losses of inert gas employed in the inert gas bubble-actuated molten metal pump, and at the same time utilizes the propellant or actuator inert gas from the inert gas bubble-actuated molten metal pump, in combination with a heat-resistant and flame-resistant cover over at least a substantial portion of the surface of the molten metal mass in a metal-melting furnace, to capture the inert gas used as actuator beneath such a cover at the surface of the molten metal mass, the combination of the various aspects of the invention as set forth hereinbefore increasing greatly the efficiency of the operation by an astute combination of the pump, the inert gas bubbles actuating the pump, and the cover, all together contributing to elevate the efficiency and economy of the operation to new and previously unattainable heights as further discussed hereinafter. It goes without saying that it is not essential that the molten metal be conveyed from one well into an adjacent well, e.g., a charge well, of a metal-melting furnace, so long as molten metal is conveyed from one section of the metal melting furnace into a second section of the metal melting furnace, and it should be clear that these two (2) sections could involve two (2) separate wells of the furnace or be present in the same well of the metal-melting furnace.

As used herein, the term "actuated", with reference to the inert gas bubble "actuated" molten metal pump, means that the pump is put into action by the inert gas. Synonymously, the pump could be said to be driven, propelled, or powered by the inert gas bubbles.

In particular, although the inert gas bubble-actuated molten metal pump of my previous U.S. Pat. No. 5,203,910 has met with considerable success in the moving of molten metal from one place to another in a metal-melting furnace and to a point outside of a metal melting furnace, when such device and process have been employed within a metal-melting furnace itself, to move molten metal from one place to another in the same well of the metal melting furnace or from one well to another in a metal-melting furnace, for purposes of effecting circulation of the molten metal therein, although a great improvement over previously-employed circulation pumps, several undesirable effects have been noted. For example, undue spattering or splashing of molten metal at the surface of the molten metal mass above the exit port of the pump has been found objectionable per se, as well as the fact that the rising bubbles of inert gas, in addition to the splashing and spattering, have caused a disruption of the protective metal oxide surface coating or dross which generally accumulates at the surface of the molten metal bath or pool, with the result that increased levels of oxidation, which would normally not be encountered, have occurred at the surface of the molten metal mass.

OBJECTS OF THE INVENTION

It is an object of the present invention to eliminate such undesirable splashing and spattering and to maintain an acceptable level of oxidized metal or dross at the surface of the molten metal bath or pool, as well as inert gas captured just below the cover and at the surface of the molten metal mass, and thus to prevent such undesirable oxidation at the surface of the molten metal mass, all by the provision of a heat-resistant and fire-resistant cover over at least a substantial portion of the molten metal pool or bath in a metal-melting furnace and above the exit port of the inert gas bubble-actuated molten metal pump, which has been found in practice to provide a readily-available, convenient, and economic solution to the problem. Another object of the invention is to provide for elimination of spattering and splashing and preservation of the thin protective layer or skin of oxidized metal at the surface of the molten metal mass. A further object is to provide a non-oxidizing atmosphere at the surface of the molten metal. An additional object of the invention is to provide for improved and more efficient utilization of the inert gas employed in the form of bubbles for actuation of the molten metal pump, which is no longer wasted but which is utilized to provide a non-oxidizing atmosphere at the surface of the molten metal in the furnace. Still other objects of the invention will become apparent hereinafter, and yet other objects will be obvious to one skilled in the art to which this invention pertains. All of these objects of the invention are in fact attained by provision of the method and the specific combination and location of the apparatus of the present invention.

SUMMARY OF THE INVENTION

What I believe to be my invention, then, inter alia, comprises the following, singly or in combination:

A method comprising the following steps: providing an inert gas bubble-actuated molten metal pump in a metal-melting furnace containing molten metal, providing a heat-resistant and flame-resistant cover above the exit port of said pump and over at least a substantial portion of the molten metal to reduce splashing and spattering at the surface of the molten metal and/or minimize rupture of a thin oxidized layer or skin of metal which exists at the surface of said molten metal, and capturing inert gas used as actuating agent in the molten metal pump beneath said cover to provide a non-oxidizing atmosphere at the surface of said molten metal and beneath said cover; such a method wherein the pump comprises an elongated conveying conduit having a lower end and an upper end, at least a portion of said conduit being inclined upward from the horizontal; such a method wherein said elongated conveying conduit is angled with an upper portion substantially horizontal and a lower portion extending downwardly at an angle to the horizontal; such a method wherein flow of molten metal in said conveying conduit is effected by means of inert gas introduced into said conveying conduit at or adjacent its lower end and rising up the incline therein to emerge at its upper end; such a method wherein said pump is between adjacent wells of said metal-melting furnace;

method wherein said pump is set at an angle in an opening in a wall between adjacent wells with its lower end submerged in molten metal in one well and its upper end in molten metal in an adjacent well; such a method wherein said elongated conveying conduit is angled with an upper portion substantially horizontal and a lower portion extending downwardly at an angle to the horizontal; such a method wherein the molten metal and the metal chips charged into the charge well comprise aluminum, magnesium, titanium, brass, iron, or steel, or an alloy thereof, or a metal for alloying one of said metals.

Moreover, a combination comprising:

a metal-melting furnace containing molten metal, an inert gas bubble-actuated molten metal pump in said furnace, and a heat-resistant and flame-resistant cover above the exit port of said pump and over at least a substantial portion of said molten metal to reduce splashing and spattering at the surface of the molten metal and to capture inert gas used as actuating agent in the molten metal pump beneath said cover to provide a non-oxidizing atmosphere at the surface of said molten metal in said furnace and beneath said cover; such a combination wherein the pump comprises an elongated conveying conduit having a lower end and an upper end, at least a portion of said conduit being inclined upward from the horizontal; such a combination wherein said elongated conveying conduit is angled with an upper portion substantially horizontal and a lower portion extending downwardly at an angle to the horizontal; such a combination wherein said conveying conduit has an inert gas and molten metal inlet at or adjacent its lower end and an inert gas and molten metal outlet at its upper end; such a combination wherein said pump is located between wells of said metal-melting furnace; such a combination wherein said pump is set at an angle in an opening in a wall between adjacent wells with its lower end in one well and its upper end in an adjacent well; such a combination wherein said elongated conveying conduit is angled with an upper portion substantially horizontal and a lower portion extending downwardly at an angle to the horizontal; and such a combination wherein said conveying conduit is molded in or routed out of a block of molten metal- and high temperature-resistant refractory material; such a combination wherein the refractory material is a graphite, ceramic, silica, or silicon carbide material; such a method wherein the cover is floated on the surface of the molten metal; and such a combination wherein the cover is a floating cover which floats upon the surface of the molten metal.

Also, in a metal-melting furnace, the following combination:

a section containing molten metal, a second section containing molten metal, an inert gas bubble-actuated molten metal pump, having an inlet end in said one section and an outlet end in said second section, located between the said two sections of said metal-melting furnace, and a heat-resistant and flame-resistant cover over at least a substantial portion of the molten metal in said second section and above the outlet of said inert gas bubble-actuated molten metal pump.

DESCRIPTION OF THE DRAWINGS

Reference is now made to the drawings, wherein.

DETAILED DESCRIPTION OF THE INVENTION

Figure 1:
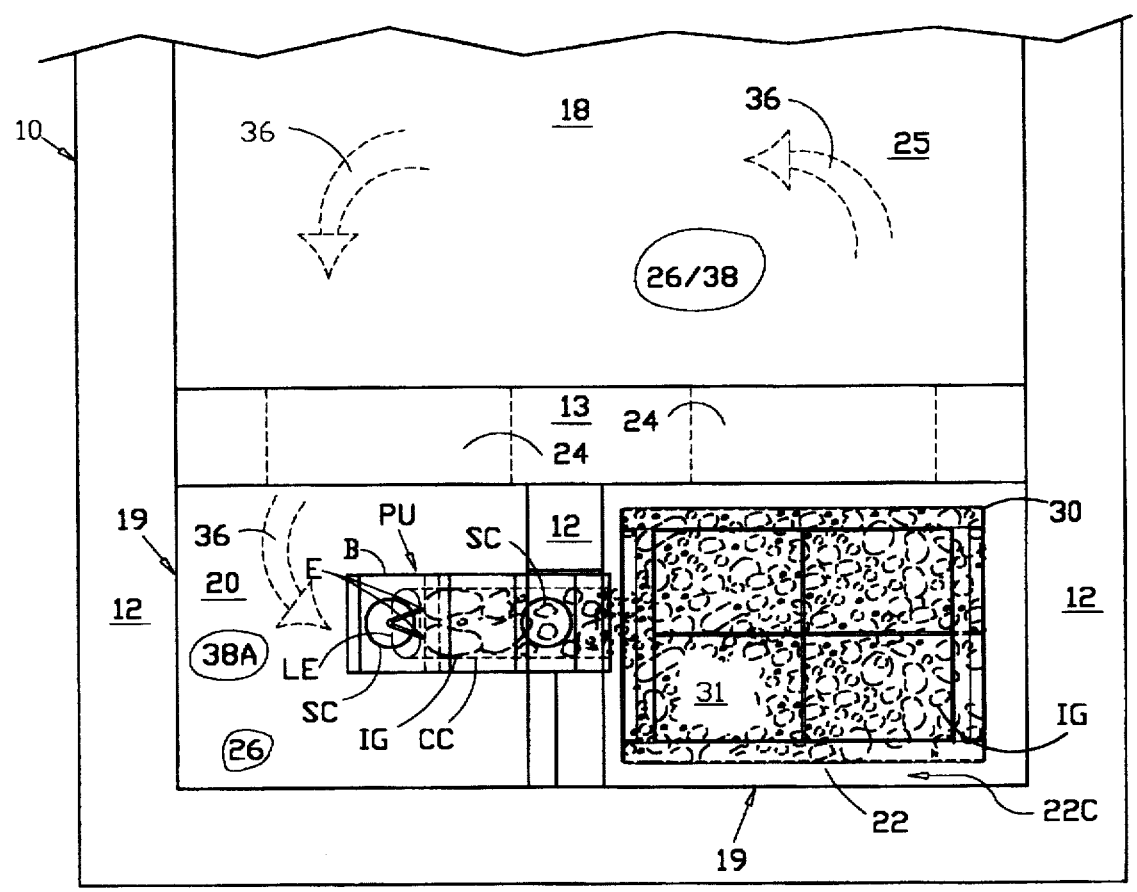
FIG. 1 is a top plan view of a metal-melting furnace, in this case a reverberatory furnace, partially schematic and partially in section, taken along line A—A of FIG. 2, to show the apparatus required according to the invention and illustrating the method of the invention, including especially the various chambers or wells of the metal-melting furnace, a cover over a substantial portion of a chamber or well thereof, and an inert gas bubble-actuated molten metal pump in a well of the furnace, here between adjacent wells, having its exit port below the cover.
Figure 2:
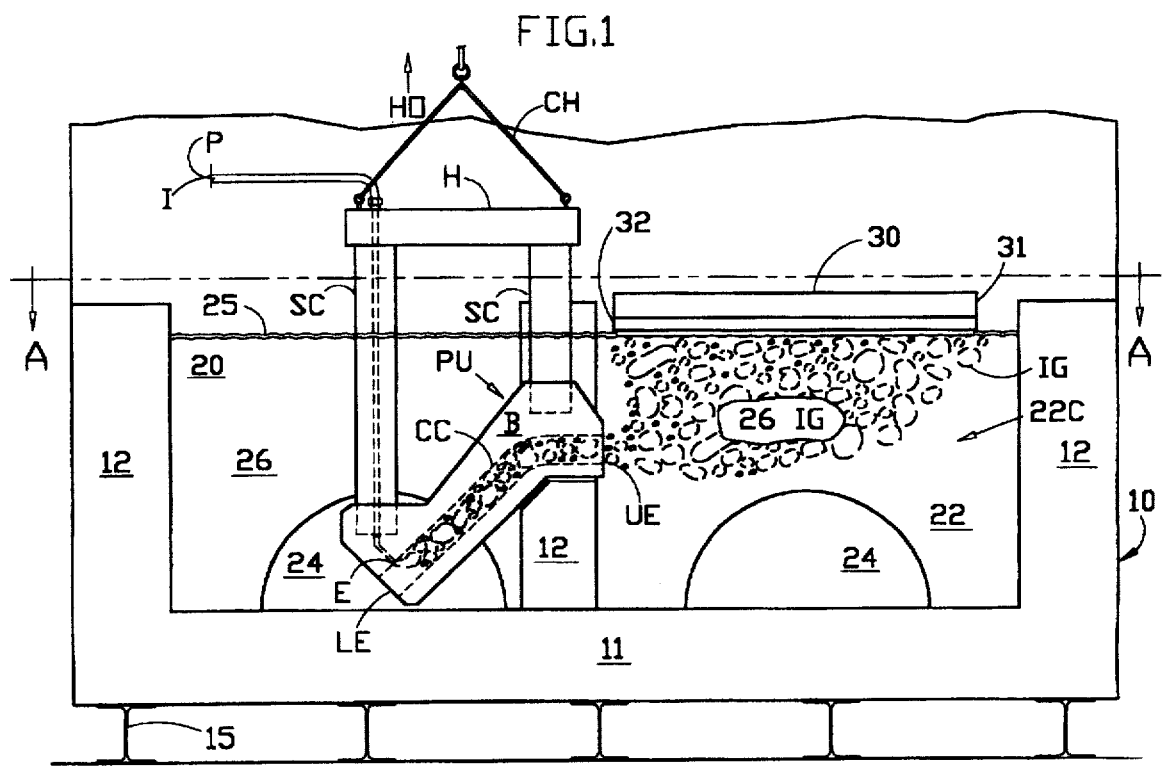
FIG. 2 is a front elevational view, partially schematic and partially in section, showing apparatus required according to the invention and illustrating the method of the invention in association with a well or wells of the reverberatory furnace, the inert gas bubble-actuated molten metal pump, its location in a wall between adjacent chambers or wells, and a heat- and flame-resistant cover over the surface of the molten metal mass in the well above the exit port of the pump.

The present invention, in both its method and apparatus aspects, will be more readily understood from the following detailed description, particularly when taken in conjunction with the drawings, in which all of the significant parts are numbered or lettered and wherein the same numbers and letters are used to identify the same parts throughout.

A metal-melting furnace, as shown a reverberatory furnace, of refractory material or having the usual refractory lining and fired by combustion burners fed by natural gas or fuel oil which throw flames into the interior of main chamber 18 thereof through usual flame-introduction means, is shown in the FIGS. at 10.

The furnace well comprises bottom wall 11 and side or vertical walls 12 and 13, with a mass of molten metal, preferably and usually aluminum or magnesium or an aluminum or magnesium alloy, therein being shown at 26. The base portions 11 of the furnace may be supported on the underlying floor by means of I-beam supports 15, as shown. Main chamber 18 is provided with main chamber extensions 19 in the form of intermediate well 20, which is usually referred to as the circulation well, and adjacent well 22, which is usually the charge well, connected with each other and with main chamber 18 by means of communicating passageways 24. Molten metal 26 is contained in main chamber 18 and is circulated from the hottest part thereof, indicated at 38, through intermediate well 20 into adjacent well 22 via communicating passageways 24. The necessary circulation throughout the furnace is provided by means of inert gas bubble-actuated molten metal pump PU, located in an opening in wall 12 between intermediate well 20 and adjacent well 22. Separate circulating means in what is normally circulation well 20 is not required. Conveying conduit CC of pump PU is molded in or routed out of a block of refractory material B, which is resistant to the molten metal 26 and the high temperatures employed, the refractory material usually being of a graphite, ceramic, silica, or silicon carbide material. Elongated conveying conduit CC is angled with an upper portion substantially horizontal and a lower portion extending downwardly at an angle to the horizontal, the lower end thereof being designated LE and the upper end thereof being designated UE. The substantially horizontal upper portion of conduit CC is a definitely preferred aspect or embodiment of the invention for attainment of the stated objectives. Upper end UE is also sometimes referred to as the exit port EP of pump PU and conduit CC.

Also visible in the drawings are the surface of the molten metal mass with its usual layer of metal oxide or dross 25, which ordinarily collects at the surface of the molten metal pool or bath or mass 26, this being shown as present in all of the wells of the metal-melting furnace 10. According to the flow path or pattern 36 in such a metal-melting furnace 10, as created by the action of the inert gas bubble-actuated molten metal pump PU and the conveying conduit CC thereof, circulation of molten metal 26 in furnace main chamber 18 is constantly and continuously moved from the hottest point 38 in main chamber 18, through communicating passageways 24, and especially by means of pump PU and conveying conduit CC thereof into intermediate well 20 and thence into adjacent well 22.

Flame-resistant and temperature-resistant cover 30, usually comprising an upper metal surface 31 which is provided with metal edging, angle iron supports, and flanges, and which advantageously has refractory material 32 secured to the flat steel plate 31 or clad thereto, and may otherwise be constituted as such a cover is described in my previous U.S. Pat. No. 5,211,744. Cover 30 preferably covers the entire upper surface of well cavity 22C and the mass of molten metal 26 therein and in any event covers as much of the surface of cavity 22C and the mass of molten metal 26 therein as is possible and convenient, and in all cases is adapted to cover a substantial portion of the surface of cavity 22C and the mass of molten metal 26 therein. When and if well 22 is used as a charge well of the furnace, a chip-charger means will be employed in conjunction with cover 30, and in such case a suitable aperture or opening will be provided in cover 30 to permit entry of a charge of new or used metal chips through cover 30 and into well cavity 22C, but this is immaterial according to the present invention.

In a preferred embodiment, the cover 30 is a self-leveling floating cover which floats upon the surface of the molten metal mass 26 and, in such case, the weight of the cover is simply reduced to a point where the density of the cover 30 is sufficiently lower than that of the molten metal mass 26 so as to permit the cover 30 to float on top of the molten metal mass. Such objective is readily attained by employing more of refractory material 32 and less heavy material such as flat steel plate 31 so as to attain the desired relation of density of the cover 30 to the density of the molten metal mass 26 and, if desired, in at least some cases cover 30 may comprise only refractory material 32 since refractory board of improved stability and increased heat- and flame-resistance is now commercially available. If desired, the cover 30 may be lifted into and out of its position atop molten metal mass 26 by means of a chain-type mechanism and hoist, such as CH and HO, so as to permit ready cleaning of the underside of cover 30 and, in case the cover 30 is a floating cover, it simply floats up and down on top of the molten metal bath 26 regardless of the metal level in the furnace chamber. As a further preferred embodiment to facilitate attainment of the objectives of the present invention, the cover 30 may also be notched, if desired, so as to straddle the exit port UE of the pump PU and its conveying conduit CC so as to permit more efficient capture of the inert gas IG emerging from the said exit port UE of the pump PU.

Returning to the inert gas bubble-actuated molten metal pump PU, as is usual the flow of molten metal 26 in the pump PU is effected by means of bubbles of inert gas IG introduced into the conveying conduit CC at or adjacent its lower end LE and rising up the incline therein to emerge at its upper end or exit port UE, at which point the molten metal 26 and the inert gas IG, together referred to as effluent 26IG, in effect "shoot out" into the molten metal 26 in well 22, the outlet or upper end and exit port UE of the conveying conduit CC, and thus of the pump PU, being directed into well 22 and the mass of molten metal 26 therein. As the bubbles of inert gas IG emerge from the upper end UE of the conveying conduit CC of pump PU and into the mass of molten metal 26 in well 22, the bubbles of inert gas IG are released and rise upwardly but, instead of escaping, at least a substantial portion of the inert gas IG is captured in well 22 beneath cover 30 thereabove and there provides a non-oxidizing atmosphere in the form of bubbles and a layer of inert gas IG at the surface of the said molten metal 26 in the charge well 22 and beneath the cover 30. Thus, the same inert gas IG used for actuation of the molten metal pump PU is used to provide a non-oxidizing atmosphere beneath the cover 30 in well 22, there is no spattering or splashing at the surface of molten metal mass in well cavity 22C and, moreover, the protective surface layer or skin of molten metal oxide or dross 25 is not disrupted in the process.

The lower end of the inert gas supply or feed line in the form of pipe P may not be or may be bifurcated (as shown) so as to provide a plurality of exit ports E for the inert gas, thereby providing a plurality of streams of inert gas bubbles IG within the conveying conduit CC for better actuation of the molten metal pump PU, if desired, or a similar result can be attained by use of a plurality of pipes P, or by the use of a multiple gas manifold, although this latter is usually employed only with a plurality of conveying conduits CC as shown in my U.S. Pat No. 5,203,910.

As shown in the drawings, the gas feed means comprises inlet port I and pipe P, having an exit port E at its lower end, which communicates with the lower end LE of the conveying conduit CC of pump PU, the pipe P being encased in a supporting column SC and the supporting block B of refractory material also being attached to supporting columns SC, the connections between support columns SC and block B being immaterial so long as they are durable, as by suitable molten-metal and heat-resistant clamps or welds, by press fitting, by welding to metal inserts, ceramic or adhesive bonding, or the like. Since the connecting means are immaterial, they are not shown in the drawings. The support columns SC are supported from hanger H, which is in turn supported by chain or cable CH connections to a ring or hook, in turn suitably connected to a hoist HO, not shown, for rapid and convenient introduction into and removal of the pump PU and its auxiliary fittings, supports, and inert gas feed line as a unit from their operative location in a well or wells of the metal-melting furnace.

OPERATION

In operation, molten metal from the main chamber 18 of the metal-melting furnace 10 is circulated, with the assistance of inert gas bubble-actuated molten metal pump PU, which is located in any well or between any wells of the furnace, and which as shown is located between what is usually referred to as the "circulation" well 20 of the metal-melting furnace and what is usually the charge well 22 of the metal-melting furnace, and in any event in or between a well or wells of the metal-melting furnace. As shown, the pump PU is located in an opening in a wall 12 between intermediate well 20 adjacent to well 22. The inert gas bubbles IG actuating, propelling, or driving the pump PU enter the conveying conduit CC at the lower end LE thereof and exit at the upper end UE thereof, the inert gas IG provided by gas feed means including inlet port I, pipe P, and exit port E, entering the pump PU and the conveying conduit CC thereof at or near the lower end LE thereof. Exiting from the upper end UE of the pump PU is a combination 26IG of the molten metal and the inert gas bubbles propelling the same. The upper end or exit port UE of the pump PU and the conveying conduit CC thereof is directed toward the area of the molten mass in well 22. The pump PU provides the necessary circulation of molten metal 26 throughout metal-melting furnace 10. In addition, rather than being wasted to the outside, the inert gas IG used to actuate the inert gas bubble-molten metal pump PU is captured in well 22 beneath the charge well-cover 30, thereby providing a non-oxidizing atmosphere of inert gas IG at the surface of the molten metal mass 26 in the charge well 22 and beneath said cover 30, which may conveniently be a floating cover, without spattering and splashing at the surface of the molten metal 26 in cavity 22C of well 22 and, moreover, without disruption of the protective layer or skin of metal oxide or dross 25 at the said surface.

Thus, according to the method and employing the apparatus of the present invention, the necessary circulation of molten metal in the metal melting furnace is efficiently effected. In addition, the inert gas employed is used not only as the actuator or propellant for the inert gas bubble-molten metal pump PU but, due to combination of pump PU with the heat-resistant and flame-resistant cover above the exit port of the pump PU and the conveying conduit CC thereof and over at least a substantial portion of the molten metal, is captured beneath the said cover and utilized to create a highly desirable non-oxidizing atmosphere at the surface of the molten metal and beneath the said cover, without spattering or splashing at the surface of the molten metal above the exit port of the pump and without disruption of the protective layer of metal oxide or dross at the said surface, thereby presenting an overall highly efficient and yet highly economical arrangement of apparatus and method for the circulation of molten metal throughout the various chambers of the metal-melting furnace, and for the establishment and maintenance of a non-oxidizing atmosphere at the surface of the molten metal mass and beneath the heat-resistant and flame-resistant cover over the surface of the molten metal mass therein.

IN GENERAL

The method and apparatus of the present invention is particularly adapted for use in connection with the melting and recycling of nonmagnetic metal scrap such as brass, aluminum, aluminum alloys, and the like, and such nonmagnetic metal scrap may conveniently be separated from a mass of metal scrap including also ferrous, ferric, or other magnetic chips by the employment of magnetic separation means, as is now well known and established in the art.

The conveying conduit of the invention as well as the gas feed means of the invention are generally constructed of high-temperature molten metal-resistant ceramic, graphite, silica, or silicon carbide or the like, and the hangers and support columns supporting the same within the metal mass are bonded thereto as by welding, clamping, or ceramic or adhesive bonding around the exterior thereof or in some cases may be molded into the ceramic, graphite, silica, or silicon carbide material of construction, or in some cases may even be of mild or stainless or such steel coated or plated with a refractory material.

As used herein, the term "metal chips" means metal chips or scrap of any type or description as is conventionally used in the art for charging into the charge well of a metal melting furnace, and includes aluminum, magnesium, titanium, brass, iron, or steel, or an alloy thereof, or a metal for alloying one of said metals.

Where, in this Specification and claims, molten metal, a molten metal mass or pool, and "metal chips" are referred to, the type of metal comprising the molten metal pool has already been described, and the term "metal chips" is to be understood as encompassing metal chips of various almost unlimited proportions, configurations, and dimensions, but particularly as including small pieces and/or particles, likewise of extremely variable dimensions, and in general the term "metal chips" is employed herein as having the usual meaning to one skilled in the art, being inclusive not only of parts, pieces, particles, and fragments of the usual type from scrap, but also previously-unused metal in standard or odd configurations remaining from previous molding, extruding, casting, rolling, or like metal processing operations, and it goes without saying that inconveniently large pieces can be reduced in size in any convenient manner and employed as metal chips and that, accordingly, any suitable metal, whether scrap or otherwise, can be converted into chips and employed in the method and apparatus of the invention, whether new metal or previously used metal, including even and especially new and used aluminum sheet and can scrap, when it is determined that such further processing into new metal is required or desired by the operator.

It is thereby seen from the foregoing that the objects of the present invention have been accomplished and that a novel, efficient, and economic method and apparatus have been provided, all in accord with the Objects of the Invention and the Summary of Invention as set forth hereinbefore.

It is to be understood that the present invention is not to be limited to the exact details of operation, or to the exact compounds, compositions, methods, procedures, or embodiments shown and described, as various modifications and equivalents will be apparent to one skilled in the art, wherefore the present invention is to be limited only by the full scope which can be legally accorded to the appended claims.

I claim:

1. A method comprising the following steps: providing an inert gas bubble-actuated molten metal pump in a metal-melting furnace containing molten metal, providing a heat-resistant and flame-resistant cover above the exit port of said pump and over at least a substantial portion of the molten metal to reduce splashing and spattering at the surface of the molten metal and/or minimize rupture of a thin oxidized layer or skin of metal which exists at the surface of said molten metal, and capturing inert gas used as actuating agent in the molten metal pump beneath said cover to provide a non-oxidizing atmosphere at the surface of said molten metal and beneath said cover.

2. A method of claim 1 wherein the pump comprises an elongated conveying conduit having a lower end and an upper end, at least a portion of said conduit being inclined upward from the horizontal.

3. A method of claim 2 wherein said elongated conveying conduit is angled with an upper portion substantially horizontal and a lower portion extending downwardly at an angle to the horizontal.

4. A method of claim 2 wherein flow of molten metal in said conveying conduit is effected by means of inert gas introduced into said conveying conduit at or adjacent its lower end and rising up the incline therein to emerge at its upper end.

5. A method of claim 1 wherein said pump is between adjacent wells of said metal-melting furnace.

6. A method of claim 5 wherein said pump is set at an angle in an opening in a wall between adjacent wells with its lower end submerged in molten metal in one well and its upper end in molten metal in an adjacent well.

7. A method of claim 6 wherein said elongated conveying conduit is angled with an upper portion substantially horizontal and a lower portion extending downwardly at an angle to the horizontal.

8. A method of claim 1 wherein the molten metal and the metal chips charged into the charge well comprise aluminum, magnesium, titanium, brass, iron, or steel, or an alloy thereof, or a metal for alloying one of said metals.

9. A combination comprising:
a metal-melting furnace for containing molten metal, an inert gas bubble-actuated molten metal pump in said furnace, and a heat-resistant and flame-resistant cover above the exit port of said pump and over at least a substantial portion of said molten metal when contained therein to reduce splashing and spattering at the surface of said molten metal when contained therein and to capture inert gas used as actuating agent in the molten metal pump beneath said cover to provide a non-oxidizing atmosphere beneath said cover and at the surface of said molten metal when contained in said furnace.

10. A combination of claim 9 wherein the pump comprises an elongated conveying conduit having a lower end and an upper end, at least a portion of said conduit being inclined upward from the horizontal.

11. A combination of claim 10 wherein said elongated conveying conduit is angled with an upper portion substantially horizontal and a lower portion extending downwardly at an angle to the horizontal.

12. A combination of claim 10 wherein said conveying conduit has an inert gas and molten metal inlet at or adjacent its lower end and an inert gas and molten metal outlet at its upper end.

13. A combination of claim 9 wherein said pump is located between wells of said metal-melting furnace.

14. A combination of claim 13 wherein said pump is set at an angle in an opening in a wall between adjacent wells with its lower end in one well and its upper end in an adjacent well.

15. A combination of claim 14 wherein said elongated conveying conduit is angled with an upper portion substantially horizontal and a lower portion extending downwardly at an angle to the horizontal.

16. A combination of claim 12 wherein said conveying conduit is molded in or routed out of a block of molten metal- and high temperature-resistant refractory material.

17. A combination of claim 16 wherein the refractory material is a graphite, ceramic, silica, or silicon carbide material.

18. A method of claim 1 wherein the cover is floated on the surface of the molten metal.

19. A combination of claim 9 wherein the cover is a floating cover which floats upon the surface of the molten metal when contained in said furnace.

20. In a metal-melting furnace, the following combination:
a first section for containing molten metal, a second section for containing molten metal, an inert gas bubble-actuated molten metal pump, having an inlet end in said first section and an outlet end in said second section, located between the said two sections of said metal-melting furnace, and a heat-resistant and flame-resistant cover above the outlet of said inert gas bubble-actuated molten metal pump and over at least a substantial portion of the molten metal when contained in said second section.

21. The method of claim 1 wherein the exit port of the inert gas bubble-actuated molten metal pump is located in a portion of the metal-melting furnace other than the charge well thereof.

22. The method of claim 21 wherein the cover is floated on the surface of the molten metal.

23. The combination of claim 9 wherein the exit port of the inert gas bubble-actuated molten metal pump is located in a portion of the metal-melting furnace other than the charge well thereof.

24. The combination of claim 23 wherein the cover is a floating cover which floats upon the surface of the molten metal when contained in said portion of said metal-melting furnace.

* * * * *

UNITED STATES PATENT AND TRADEMARK OFFICE
CERTIFICATE OF CORRECTION

PATENT NO. : 5,735,935
DATED : April 7, 1998
INVENTOR(S) : Larry D. Areaux

It is certified that error appears in the above-identified patent and that said Letters Patent is hereby corrected as shown below:

Title Page, <u>Attorney, Agent, or Firm</u> - "Heuschen" should read -- Hueschen --. See Declaration of Inventor.

Signed and Sealed this

Ninth Day of June, 1998

Attest:

BRUCE LEHMAN

*Attesting Officer*    *Commissioner of Patents and Trademarks*